(12) United States Patent
Hillary et al.

(10) Patent No.: US 8,019,755 B2
(45) Date of Patent: Sep. 13, 2011

(54) INTERNET-USER ACCESSIBLE SYSTEM DATABASE COMPUTER METHOD AND SYSTEM FOR ANALYZING GOVERNMENT LEGSILATION AND LEGISLATIVE DOCUMENTS, STATUTES, BILLS, BY-LAWS, PROPOSALS AND AMENDMENTS

(75) Inventors: Robin Hillary, Murrieta, CA (US); Michelle McCarthy, Menifee, CA (US)

(73) Assignee: LitCentral, Inc., Temecula, CA (US)

( * ) Notice: Subject to any disclaimer, the term of this patent is extended or adjusted under 35 U.S.C. 154(b) by 0 days.

(21) Appl. No.: 12/927,758

(22) Filed: Nov. 23, 2010

(65) Prior Publication Data
US 2011/0078142 A1   Mar. 31, 2011

(51) Int. Cl.
*G06F 17/30* (2006.01)
(52) U.S. Cl. ............... 707/728; 707/641; 707/748
(58) Field of Classification Search ............... 707/713, 707/723, 641, 728, 732, 748
See application file for complete search history.

(56) References Cited

U.S. PATENT DOCUMENTS

| | | | | |
|---|---|---|---|---|
| 4,799,156 A | * | 1/1989 | Shavit et al. | 705/26.3 |
| 5,379,423 A | * | 1/1995 | Mutoh et al. | 707/821 |
| 5,469,206 A | * | 11/1995 | Strubbe et al. | 725/60 |
| 5,623,679 A | * | 4/1997 | Rivette et al. | 715/255 |
| 5,630,125 A | * | 5/1997 | Zellweger | 707/803 |
| 5,826,020 A | * | 10/1998 | Randell | 709/202 |
| 5,829,002 A | * | 10/1998 | Priest | 707/705 |
| 5,835,091 A | * | 11/1998 | Bailey et al. | 715/854 |
| 5,848,424 A | * | 12/1998 | Scheinkman et al. | 715/210 |
| 5,862,325 A | * | 1/1999 | Reed et al. | 709/201 |
| 5,889,945 A | * | 3/1999 | Porter et al. | 709/204 |
| 5,923,325 A | * | 7/1999 | Barber et al. | 715/711 |
| 5,943,048 A | * | 8/1999 | Nyman | 715/808 |
| 6,005,570 A | * | 12/1999 | Gayraud et al. | 715/709 |
| 6,029,174 A | * | 2/2000 | Sprenger et al. | 707/705 |
| 6,275,789 B1 | * | 8/2001 | Moser et al. | 704/7 |
| 6,434,568 B1 | * | 8/2002 | Bowman-Amuah | 707/803 |

(Continued)

FOREIGN PATENT DOCUMENTS
WO    WO 02/59735 A1 * 8/2002

OTHER PUBLICATIONS

Ashu Guru, Paul Savory, Robert Williams, "Web-based simulation management: a web-based interface for storing and executing simulation models", 2000, WSC '00: Proceedings of the 32nd conference on Winter simulation, retrieved from ACM digital library.*

*Primary Examiner* — Shahid Alam

(57) ABSTRACT

The present invention relates to a computer method and system for analyzing, critiquing and providing feedback on or for government legislation and legislative documents, statutes, bills, by-laws, proposals and amendments hereto for referred to as legislation or legislative document, and more particularly, to a computer method and system for quantifying key components and sections within the legislation or legislative document. This computer method and system works in conjunction with a document management system. This computer method and system quantifies the feedback of the user based on a single user or multiple users' opinion. The result is a computerized document in the form of a report that can be printed, collaborated, managed and distributed electronically. The key component used to quantify feedback is a scoring tool with a set of criteria and standards used to assess the legislation or legislative document.

4 Claims, 8 Drawing Sheets

U.S. PATENT DOCUMENTS

Figure 1A:
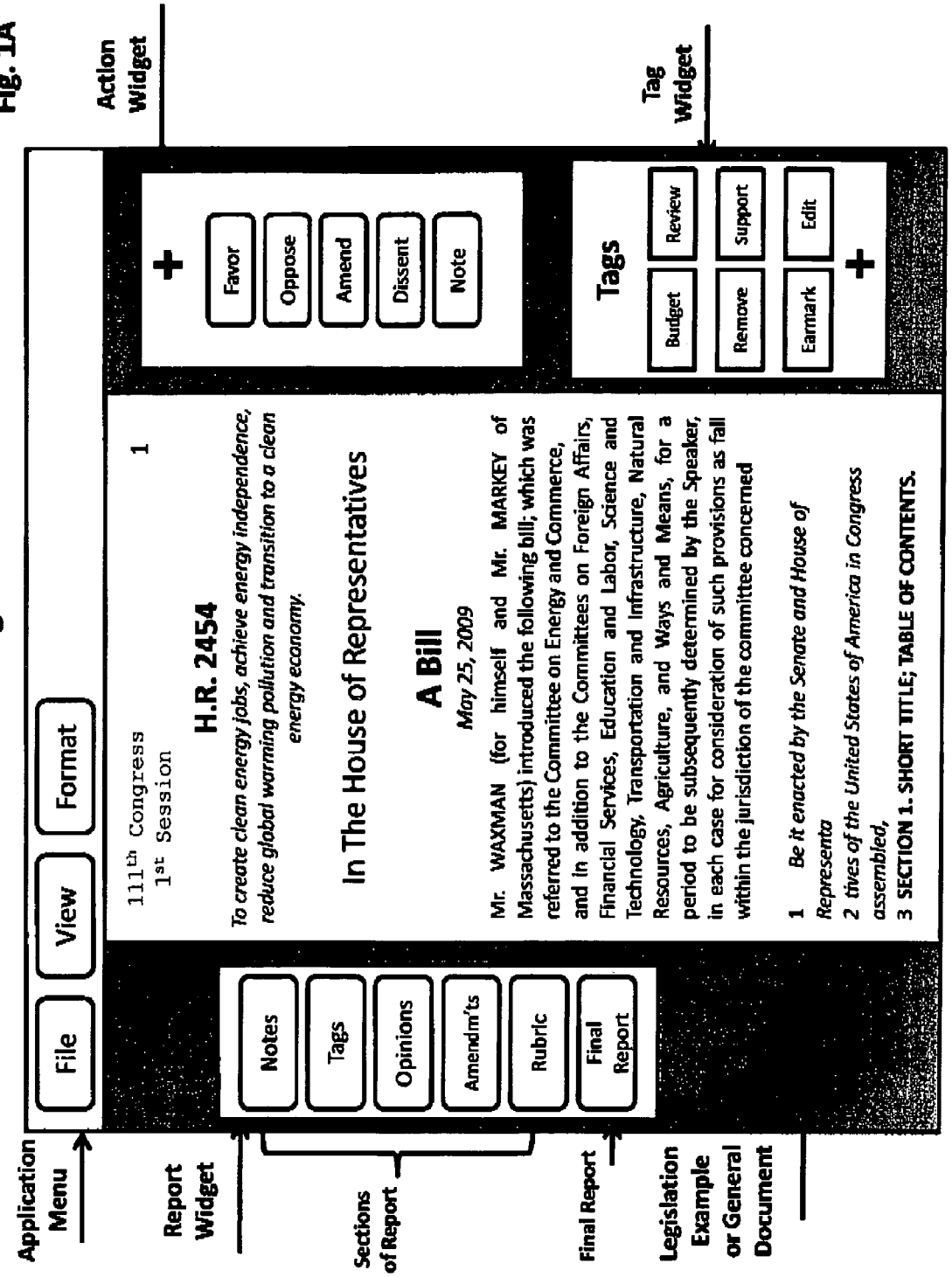
Figure 2B:
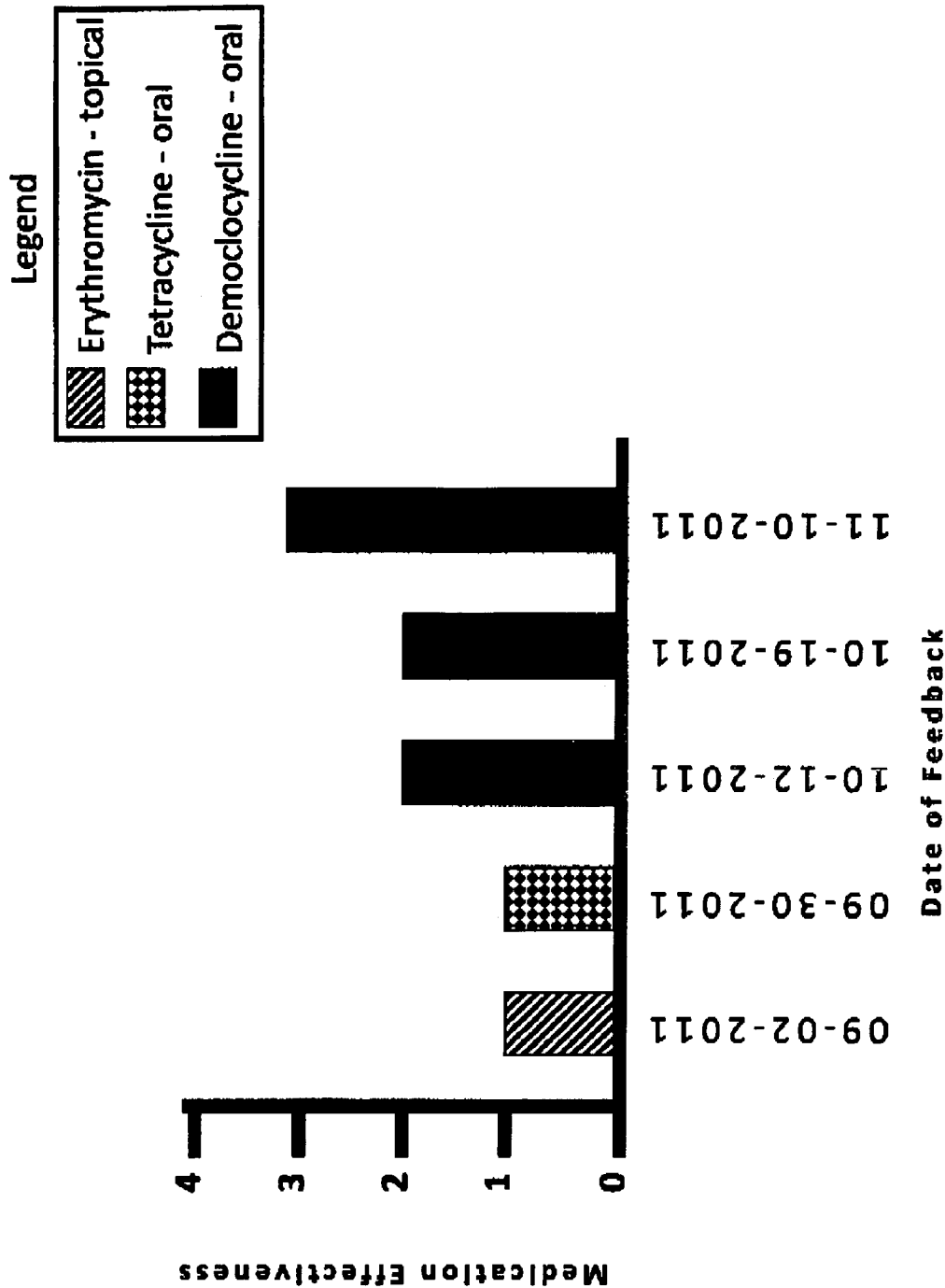

| | | | |
|---|---|---|---|
| 6,442,748 B1 * | 8/2002 | Bowman-Amuah | 717/108 |
| 6,601,026 B2 * | 7/2003 | Appelt et al. | 704/9 |
| 6,671,818 B1 * | 12/2003 | Mikurak | 714/4.21 |
| 6,721,729 B2 * | 4/2004 | Nguyen et al. | 707/769 |
| 6,978,046 B2 * | 12/2005 | Robinson et al. | 382/209 |
| 7,013,290 B2 * | 3/2006 | Ananian | 705/26.42 |
| 7,076,736 B2 * | 7/2006 | Hugh | 715/743 |
| 7,089,237 B2 * | 8/2006 | Turnbull et al. | 707/723 |
| 7,277,928 B2 * | 10/2007 | Lennon | 709/219 |
| 7,698,316 B2 * | 4/2010 | Song et al. | 707/608 |
| 2002/0023086 A1 * | 2/2002 | Ponzio, Jr. | 707/723 |
| 2002/0152267 A1 * | 10/2002 | Lennon | 709/203 |

* cited by examiner

Fig. 1B

Rubric – Probability of user's vote

| Element | 1 | 2 | 3 | 4 |
|---|---|---|---|---|
| Clean Energy Requirement | I am adamantly opposed | I disagree | I am in agreement | I strongly agree |
| Energy Efficiency | I am adamantly opposed | I disagree | I am in agreement | I strongly agree |
| Coal Authority | I am adamantly opposed | I disagree | I am in agreement | I strongly agree |
| Security of Energy Supplies | I am adamantly opposed | I disagree | I am in agreement | I strongly agree |

Fig. 1C

Government Legislation Review

[ File ] [ View ] [ Format ]

Final Analysis Report
Legislation Document
H.R. 2454

- ■ Strongly Agree
- ■ Agree
- ▫ Disagree
- ▫ Adamantly Disagree

| Page | Sect. | Tag/Action | Selected Text |
|------|-------|------------|---------------|
| 131 | 159 | Favor | Part II of the Federal Power Act (16 U.S.C. 824 12 seq.) is amended by adding after section 216 the following |
|  |  |  | The Representative from Kansas supports the amendment included in SEC. 216A. Regional electric grid planning should also include yet undefined renewable technology. |
| 200 | 228 | Amendment | STUDY OF OCEAN RENEWABLE ENERGY AND 18 TRANSMISSION PLANNING AND SITING 19 (a) Definitions in this section |
|  |  |  | Add sub section (D) to include the following: Accounting for all ecosystem interactions and direct, indirect, and cumulative impacts of human and animal activities on the ecosystem. |

[ Notes ] [ Tags ] [ Opinions ] [ Amendm'ts ] [ Final Report ]

+
[ Favor ] [ Oppose ] [ Amend ] [ Dissent ] [ Note ]

Tags
[ Budget ] [ Review ] [ Remove ] [ Support ] [ Earmark ] [ Edit ]
+

Rubric Results Vote Probability

View Final Report

Final Report

Fig. 2A

Medical Rubric – Patient Feedback

Patient Name :          Date of Birth:          Gender:          Known Allergies:

Medication/Treatment: Erthromycin
Date of Feedback: 09/02/11          [1.0] Avg. Score

|  | 1 | 2 | 3 | 4 |
|---|---|---|---|---|
| Side Effects | Multiple side effects | Some side effects (intolerable) | Some side effects (tolerable) | No side effects |
| Response to Medicine | Symptoms still present (no response) | Some response but still experiences problem(s) | Noticeable improvement | Symptoms eliminated |

[Save]

Medical Rubric – Doctor Diagnosis

Patient Name : John Doe   Date of Birth: 01/01/91   Gender: Male

Input Symptoms: Calcium buildup, Patellar tendon pain, swelling

[ Generate Rubric ]

☐ Condition Probability

| 1 | 2 | 3 | 4 |
|---|---|---|---|
|   |   |   |   |
|   |   |   |   |

Fig. 3A

Fig. 3B

Medical Rubric -- Doctor Diagnosis

Patient Name: John Doe     Date of Birth: 01/01/91     Gender: Male

Input Symptoms: Calcium buildup, Patellar tendon pain, swelling     [Generate Rubric]

[1.5] Condition Probability

| Possible Condition | 4 | 3 | 2 | 1 |
|---|---|---|---|---|
| Bone Malignancy | Exhibits NONE of the following:<br>•No Family History<br>•No Breakage<br>•Negative MRI results | Exhibits ONE of the following:<br>•Family History<br>•Breakage<br>•Positive MRI results | Exhibits TWO of the following:<br>•Family History<br>•Breakage<br>•Positive MRI results | Exhibits THREE of the following:<br>•Family History<br>•Breakage<br>•Positive MRI results |
| Chondrosarcoma | Exhibits NONE of the following:<br>•Pain, dull in character<br>•Local swelling<br>•Tumor close to joint<br>•Tumor occurs as pathological fracture | Exhibits ONE of the following:<br>•Pain, dull in character<br>•Local swelling<br>•Tumor close to joint<br>•Tumor occurs as pathological fracture | Exhibits TWO of the following:<br>•Pain, dull in character<br>•Local swelling<br>•Tumor close to joint<br>•Tumor occurs as pathological fracture | Exhibits THREE or more of following:<br>•Pain, dull in character<br>•Local swelling<br>•Tumor close to joint<br>•Tumor occurs as pathological fracture |

[More ▶]

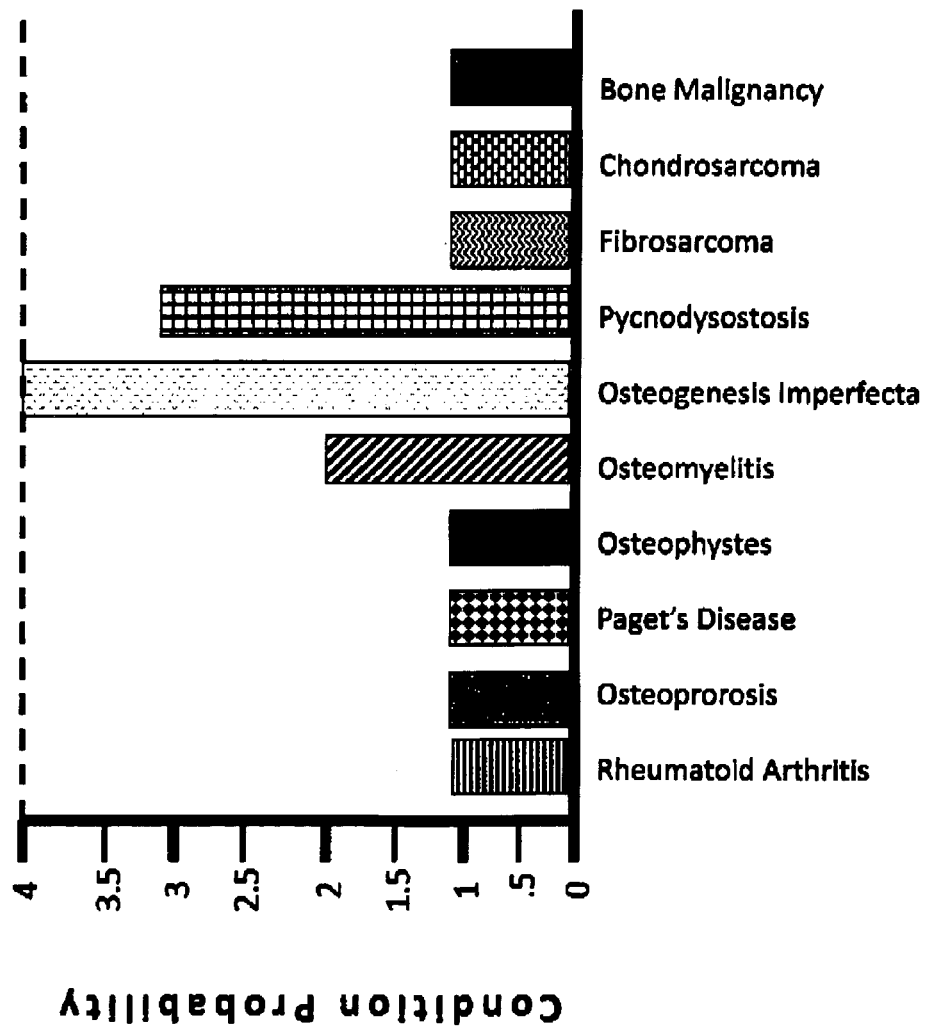

INTERNET-USER ACCESSIBLE SYSTEM DATABASE COMPUTER METHOD AND SYSTEM FOR ANALYZING GOVERNMENT LEGSILATION AND LEGISLATIVE DOCUMENTS, STATUTES, BILLS, BY-LAWS, PROPOSALS AND AMENDMENTS

CROSS-REFERENCE TO RELATED APPLICATIONS

This application claims the benefit of U.S. Provisional Application No. 60/830,561, filed Jul. 12, 2006, the entire contents of which are hereby incorporated by reference.

BACKGROUND OF THE INVENTION

1. Field of the Invention

The present invention relates to a computer method and system for analyzing, critiquing and providing feedback on or for government legislation and legislative documents such as statutes (an enactment of a legislative body expressed in a formal document codifying the result of deliberations of a committee or society), bills (a draft of a new act or a draft of an amendment to alter an existing act), by-laws (laws made by statutory authorities or local councils contain details necessary to carry out specific matters relating to the act), proposals (a response to written requirements issued by a government entity) or amendments (change or alteration to existing legislation or acts) or using a scoring methodology and working in conjunction with a document management system.

2. Description of Related Art

For the analysis of electronic legislation or legislative documents (i.e. statutes, bills, by-laws, proposals and amendments) created with personal computer word processing programs (e.g., Microsoft Word, TM files, HTML files, XML files, or any other type of ACSCII or binary data representing a document).

Legislation or legislative documents in their very nature are documents which call for analysis, interpretation, deliberation, agreement (oral or written), amending, clarification and dispute. The current method employed by our state, local and federal governments to determine if legislation is to be enacted requires that said legislative documents be reviewed, considered, accepted or amended by a legislature or governing body.

The inherent problem with the current method of analyzing government legislation or legislative documents is the current review, consideration and or analyzing process. The process is, in part, subjective in nature, and there is no fundamental basis for agreement by which this legislation or legislative documents are assessed. The process is derived from antiquated methods of interpreting text documents be they electronic or paperbound which uses very little if any advances in technology to aid lawmakers in understanding the quality, relevance, or overall content. In addition, the overall opinion of the legislation or legislative document is not determined numerically and therefore the feedback cannot be quantified. Any standards in place alternate between individuals (e.g. representatives, government representative, elected official, staff member (permanent and non-permanent), party secretary, aid, subscriber, etc.) and or entities (e.g. committees, legislative bodies, etc.) with the feedback about the legislation or legislative document given in verbal or text-written format. Therefore, the decision as to which direction the legislation or legislative document should proceed is a laborious process and often misguided.

The current method becomes more complicated when multiple individuals must merge feedback and opinions and come together in committees or legislative bodies to consider, amend and vote.

Another problem is the mere size and magnitude of the legislation and legislative documents being introduced to our legislative bodies, as it is often seen as overwhelming to elected officials who are required to read and understand the document. An example of this in U.S. congress was with the recent healthcare reform which exceeded over 1,990 pages. High-ranking elected officials stated that it was too laborious and overpowering to expect elected officials to read the entire healthcare reform bill, in its entirety before voting. Though most elected officials employ staffers to help read and determine their position on legislation, the mere size, confusion in wording and overwhelming content proves too much and too arduous using the outdated techniques employed by our governments today. In paperbound or electronic format there are currently no toolsets in use that are designed for the specific task of understanding and considering legislation.

It is assumed legislation and legislative documents are received both electronically and in paper format. It is assumed that electronic versions of these documents are stored in document management systems (i.e. a computer system or set of computer programs used to track and store electronic documents and/or images). The problem with this current method is while document management systems are solutions for storing, archiving and retrieving legislative documents, these systems do not offer solutions for obtaining or gathering Metadata (i.e. Data that describes, highlights and/or explains other data), as it relates to feedback, because the current method of assessing does not quantify feedback. Feedback is simply a text-written response or orally communicated.

The system is adapted to generate graphical and text images for providing a user interface between a legislative document and a user. The system uses a type of computer system (i.e. a machine that manipulates data according to a set of instructions), the internet (i.e. a vast number of computers and computer networks that are interconnected through communication links. The interconnected computers exchange information using various services, such as electronic mail, and the World Wide Web (WWW)), intranet (i.e. a private computer network that uses Internet technologies to securely share any part of an organization's information), or other network system to give users access to, but not limited to, the legislation or legislative document, reports, graphs, images, toolsets, and scoring tools.

The system is built to work within a web browser as a Software as a Service (SaaS) (i.e. a model of software development whereby a provider licenses an application to customers for use as a service on demand) or as a desktop application (with internet or intranet functions) or within a computer network. At present, the most widely used web browsers are Microsoft Internet Explorer (an Internet browser from Microsoft), Safari (a web browser developed by Apple Inc.), and Firefox (a free web browser descended from the Mozilla Application Suite and managed by Mozilla Corporation) of which there are several versions. Defined broadly, a web browser is an application that interprets and arranges sections (i.e. text, sound images, etc.) on a displayed web page so a user can see and interact with network content. Defined a bit more specifically, a browser is a software that interprets the programming language of the Internet into the text, graphics, sounds and effects (i.e. such as blinking, scrolling, etc.) that one sees when viewing a web page. A stand-alone desktop application further defined, is built to work independently of a network or server on a desktop or laptop computer. A computer network further defined is a system in which computers are connected to share information and resources.

The present invention can be implemented on a variety of devices with internet capabilities, such as personal computers, mobile devices, ultra-mobile devices, and e-readers and can be interfaced using a mouse, keyboard, keypad, digitizer, touch screen, and/or voice command.

The system assigns a unique identifier code to each piece of legislation or legislative document and to each user for identification and tracking purposes. Unique identifier codes are stored in the system database on the client/server-based computer system.

In the context of internet information exchange, the most important components are the graphical user interface (i.e. GUI) of the user's computer and the browser itself.

The system receives, stores and compiles information for both legislation and legislative documents and users within a system database (i.e. a structured collection of records or data that is stored in a computer system). When the system receives a request from a user, the system compiles all information stored in association to the requested legislation or legislative document, and presents it to the user in graphical and text format.

Multiple scenarios are possible for implementing a system according to the present invention. For example, the system can be hosted on a shared server or a dedicated single server.

As used herein, "legislation or legislative document" can comprise one or more pieces government legislation such as statutes (an enactment of a legislative body expressed in a formal document codifying the result of deliberations of a committee or society), bills (a draft of a new act or a draft of an amendment to alter an existing act), by-laws (laws made by statutory authorities or local councils contain details necessary to carry out specific matters relating to the act), proposals (a response to written requirements issued by a government entity) or amendments (change or alteration to existing legislation or acts).

As used herein, a "user" can also be defined as a government representative, elected official, staff member (permanent and non-permanent), representative, party secretary, aid, subscriber or anyone who has subscribed to the present invention or has been given access to the invention by a subscriber, and one who reads, reviews and or assess legislation or legislative documents.

The term "user's network" can be applied to an individual user, or a group of users within the same entity, and is intended to encompass a collection of two or more computers in electronic communication via common protocols. The system database offers a secure user network for accessing legislation or legislative documents on client/server-based computer system. Each user (or user's entity) has its own secure "user network" within the system database.

Document management systems have existed for managing various types of documents. Computer systems have existed for generating and maintaining system databases containing documents, pages, and other items. One popular computer-system implemented system database comprises a registry system in which a number of specific merchandise items are listed for a given party, and a user can select from the list of specific merchandise items. U.S. Pat. No. 5,469,206 to Strubb et al. discloses an electronic catalog which is updated at predetermined intervals. A user of the electronic catalog can enter data to facilitate the user's viewing of only particular, predetermined portions of an electronic catalog, according to the user's instructions. Another prior-art reference, U.S. Pat. No. 4,799,156 to Shavit et al., discloses a system for interactive on-line electronic communications and processing of business transactions between a plurality of different types of independent users.

BRIEF SUMMARY OF THE INVENTION

An embodiment of the present invention provides a method and system for analyzing and providing feedback on legislation or legislative documents and quantifying the results. The results are presented in a detailed computerized document, in the form of a report that can be printed, collaborated on and distributed electronically. There is great value when objectivity is considered within the legislation or legislative documents review, feedback and determination process.

The present invention presents a standard set of criteria (i.e. a fundamental basis for agreement) within scoring tools, for which the feedback of the legislation or legislative documents is to be presented, resulting in an overall numeric score of the legislation or legislative document.

The present invention also includes a scoring tool and analyzing toolsets for determining the range of which a user is in agreement (i.e. strongly agree, agree, disagree, adamantly oppose, etc.) throughout the assessment of the proposed legislation or legislative document. The range in which a user agrees is extremely important in assessing legislation or legislative documents as it determines the possible probability of whether or not it will gain the user's support.

Additional toolsets include the ability to tag using frequent words that apply to the respective legislation or legislative document. For example, words that might apply to one who analyzes legislation are the following: pork, compromise, support, amend, clarify, not relevant, etc. So the user does not have to retype these words throughout the analyzing process, they are available in the form of tags. In the final digital report format this data is displayed and dichotomized into columns displaying corresponding page number, section/subsection, selected text and corresponding tag.

The present invention advances legislation or legislative document management systems into "Expert Systems" (i.e. software that attempts to reproduce the performance of one or more human experts) by providing analyzing toolsets and scoring tools that present feedback in the form of numeric values. Currently, there are no known systems in the federal, state or local governments that offer a way to quantify feedback of legislation or legislative documents.

While the software and method have or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112.

Any feature or combination of features described herein are included within the scope of the present invention provided that the features included in any such combination are not mutually inconsistent as will be apparent from the context, this specification, and the knowledge of one skilled in the art. In addition, any feature or combination of features may be specifically excluded from any embodiment of the present invention. For purposes of summarizing the present invention, certain aspects, advantages and novel features of the present invention are described. Of course, it is to be understood that not necessarily all such aspects, advantages or features will be embodied in any particular implementation of the present invention. Additional advantages and aspects of the present invention are apparent in the following detailed description and claims that follow.

DETAILED DESCRIPTION OF INVENTION

Reference will now be made in detail to the presently preferred embodiments of the invention. The focus of the present invention is not on the document management system, but on the analyzing methodology for assessment of the legislation or legislative document.

Although the disclosure herein refers to certain embodiments, it is to be understood that these embodiments are presented by way of example and not by way of limitation. The intent of this disclosure, while discussing exemplary embodiments, is that the following detailed description be construed to cover all modifications, alternatives, and equivalents of the embodiments as may fall within the spirit and scope of the invention as defined by the appended claims. It is to be understood and appreciated that the process steps and structures described herein do not cover a complete process flows. The present invention may be practiced in conjunction with various techniques that are conventionally used in the art, and only so much of the commonly practiced process steps are included herein as are necessary to provide an understanding of the present invention.

The present invention relates to the computer method and system for analyzing statutes, bills, by-laws, proposals and amendments (i.e. legislation or legislative documents) for quantifying key components and sections within legislation or a legislative document. The primary anticipated use of this system is to assist users in the federal, state and local governments in combining multiple opinions, assessing feedback and determining the probability of passage.

Digital legislation or legislative documents are first created using one of the many word processing applications available for correctly formatting text. Once completed, the legislation or legislative document is saved on the local hard drive in XML (i.e. is a set of rules for encoding documents electronically) or PDF (i.e. portable document format) or in its original file format. Now that the document is saved on the local hard drive a user would connect to the user network on the client/server-based computer system to upload the legislation or legislative document to the present invention. The client/server-based computer system will then prompt the user to browse their local hard drive to upload the legislation or legislative document and input various Metadata (i.e. author, content, type, etc.) into data input fields and associated drop-down buttons. This data will compile onto the client/server-based computer system where the present invention resides and be associated with a unique identifier code. The legislation or legislative document itself is given a unique identifier code for the purposes of tracking and identification. The uploaded legislation or legislative document is now saved in the user's network and by user choice can be shared or collaborated with other user networks. As used throughout this specification, the term network, user network or digital network is intended to include two or more computers in electronic communication via common protocols.

The system database is accessed by a user who has a computer system and internet browser. It is the user's intent to read, edit, analyze and or critique the legislation or legislative document. The user is going to retrieve the legislation or legislative document from the present invention, residing on the client/server-based computer system. Once the document is open inside of the present embodiment, a user has access to a series of toolbars within the graphical user interface. Each function within the toolbar can be accessed via an icon or a drop-down menu. These toolbars consist of a group of icons, each associated with a particular section of the report and are used to navigate sections of the final digital report to give an opinion using keywords (e.g. pork, compromise, support, amend, clarify, not relevant, etc.), or to track comments, tags or notes made by a user. Again, one of the key components of this invention is to expedite the legislation or legislative document review time, and provide analyzing toolsets to a user. While the user is analyzing the document, the feedback, notes and the selected text are compiled into a report that can be accessed at any time via the toolbar used for navigating the final digital report.

Once the legislation or legislative document is open in the present invention, the user begins to read the legislation or legislative document. During the course of the read, the user will want to comment or give feedback on certain sections of text throughout the document. Therefore the user is presented with a general user interface that provides toolbars and toolsets (e.g. tags) used to assist the user in analyzing and providing an opinion. The following detailed description can be applied anywhere throughout the reading and analyzing of the legislation or legislative document.

A toolset, located within the GUI, offers common text (i.e. tags) used to identify a user's feedback and opinions during analysis of the legislation or legislative document. A user would select text using the mouse interface and then selects a tag (e.g. pork, compromise, support, amend, clarify, not relevant, etc.) by clicking on the associated icon on the tag toolbar. The selected tag would then be applied to the selected text. Each time a user selects text and applies a relative tag, the selected text along with the tag, are compiled and stored in the system database and is displayed in text, graph and numeric format on the final digital report.

Every time a user advances a page into the legislation or legislative document the browser receives the HTML code for the prior page. If the user has selected and tagged text, the scripting module using known techniques, then builds the corresponding selections for review in the final digital report. For example, all text that has been selected and tagged will be presented in a three-column format on the final digital report displaying the page number, the tag and the associated text, and any text input into the note field.

According to another aspect of the invention the scripting module is programmed using known VBSscript or Java Script (for example) techniques, to process multiple or chained key press events rather than merely single events. For example, a user might select a string of text and associate it with one or more relative tags. When this tag is selected the Metadata is attached to the legislation or legislative document and placed back into the system database, one can now search the system database for legislation or a legislative document with regard to a specific number of relative tags. Again, because the text tags are counted and quantified within the present embodiment they can be compiled and displayed in various text, graph and numeric formats on the final digital report.

After the user has read the legislation or legislative document, in order to quantify their overall feedback; they are presented with a color-coded (e.g. red, yellow, blue, green) grading toolset that displays a series sections (e.g. subsection, paragraph, clause, item, etc.). Each section has corresponding declarative statements all of which combined provide a fundamental basis for agreement. This scoring toolset is accessed using the applicable icon on the navigation toolbar. Each declarative statement is associated with a numeric value (e.g. 1.0-4.0). The scripting module in the HTML code of the page is preferably coded so that when a user selects one declarative statement for each section, the numeric value associated with the declarative statement is auto-calculated to create an overall numeric value of the legislation or legislative document. The overall numeric value is represented by two digits (e.g. 1.0-4.0). For example, if there are seven sections, in which all declarative statements received a score of 3, then the overall numeric value of the legislation or legislative document would be equal to 3.0. Now, the feedback, as it relates to the legislation or legislative document is quantified, with the final digital report displaying the value of each section—and an overall scoring of all sections. When this Metadata is attached to the legislation or legislative document and placed back into the system database, one can now search the system database for legislation or a legislative document that has an overall score based on the feedback of one or more users. Furthermore, an in depth search can be conducted in which a user wishes to retrieve from the database pieces of legislation or a legislative document with specific section values. For example, a staff member who is a user can search the system database specifically for a section with a value of 3 or for a piece of legislation or legislative document with an overall score of 3.8. All data is compiled and stored in the system database and is displayed in text, graph and numeric format on the final digital report.

The scoring toolset generates a corresponding bar graph, depicting the overall value of all scored sections, as well as the score for each individual section. The "y" axis represents the score (e.g. 1.0-4.0) and the "x" axis represents the section (e.g. subsection, paragraph, clause, item, etc.). The result for each score obtained by using the scoring toolset is depicted in a corresponding color (e.g. red, yellow, blue, green). For example, if a section received a 4 in the scoring toolset, the bar graph would be represented by the color green, and the "y" axis associated with the section would be equal to 4.0. While any color might be coded into the invention, in this particular example we used the color green to associate with a numeric value of 4. All data is compiled and stored in the system database and is displayed in text, graph and numeric format on the final digital report.

Every time a user advances a page into the legislation or legislative document the browser receives the HTML code for the prior page. If the user has selected and tagged text, the scripting module using known techniques, then builds the corresponding selections for review in the final digital report. For example, all text that has been selected and tagged will be presented in a three-column format on the final digital report displaying the page number, the tag and the associated text, and any text input into the note field.

Because feedback is now associated with a numeric value, the present invention can merge an indefinite number of final digital reports associated with a single analyses of a piece of legislation or legislative document thereby presenting an overall quantified opinion. Entities can determine the value of this overall opinion as it relates to their infrastructure.

It should now be clear that this invention provides several advantages over current analyzing methods. The present invention compiles and quantifies feedback associated with a piece of legislation or legislative document, while simultaneously constructing an overall report of the quantified feedback, Metadata, tags and notes. Currently there is no application on the market, for the specific industries targeted by the present invention that turns feedback into quantifiable data, and displays it inside a final digital report in the form of text and graphs.

We claim:

1. A computer method in a document management system for analyzing, critiquing and quantifying government legislation or legislative documents including statutes, bills, by-laws, proposals and amendments, comprising:
   using declarative statements in order to objectify feedback;
   applying a numeric value to each declarative statement in order to objectify feedback;
   producing an overall grade by using a running calculation of each section within the scoring system;
   merging the quantified opinion of multiple users;
   providing a standard set of criteria on which to form a fundamental basis for agreement;
   applying descriptive tags to selected text for the purposes of tracking a reviewer's opinion;
   calculating each descriptive tag to quantify the reviewer's overall feedback;
   tagging selected text with frequent words/comments;
   choosing selected text for comments and feedback;
   creating a detailed computerized document, in the form of a report that can be printed, collaborated and distributed electronically;
   compiling quantified feedback for tracking trends, searching, archiving and enhancing the system database.

2. A computer system in a document management system for analyzing, critiquing and quantifying government legislation or legislative documents including statutes, bills, by-laws, proposals and amendments, comprising:
   using declarative statements in order to objectify feedback;
   applying a numeric value to each declarative statement in order to objectify feedback;
   producing an overall grade by using a running calculation of each section within the scoring system;
   merging the quantified opinion of multiple users;
   providing a standard set of criteria on which to form a fundamental basis for agreement;
   applying descriptive tags to selected text for the purposes of tracking a reviewer's opinion;
   calculating each descriptive tag to quantify the reviewer's overall feedback;
   tagging selected text with frequent words/comments;
   choosing selected text for comments and feedback;
   creating a detailed computerized document, in the form of a report that can be printed, collaborated and distributed electronically;
   compiling quantified feedback for tracking trends, searching, archiving and enhancing the system database.

3. A computer method in a document management system for analyzing, critiquing and quantifying medical documents, health records and medical charts including patient records, doctor's notes, medications, treatments, patient feedback, symptoms, diagnosis and images comprising:
   using declarative statements in order to objectify feedback;
   applying a numeric value to each declarative statement in order to objectify feedback;
   producing an overall grade by using a running calculation of each section within the scoring system;
   merging the quantified opinion of multiple users;
   providing a standard set of criteria on which to form a fundamental basis for agreement;
   applying descriptive tags to selected text for the purposes of tracking a reviewer's opinion;
   calculating each descriptive tag to quantify the reviewer's overall feedback;
   tagging selected text with frequent words/comments;
   choosing selected text for comments and feedback;

creating a detailed computerized document, in the form of a report that can be printed, collaborated and distributed electronically;

compiling quantified feedback for tracking trends, searching, archiving and enhancing the system database.

4. A computer system in a document management system for analyzing, critiquing and quantifying medical documents, health records and medical charts including patient records, doctor's notes, medications, treatments, patient feedback, symptoms, diagnosis and images comprising:

using declarative statements in order to objectify feedback;

applying a numeric value to each declarative statement in order to objectify feedback;

producing an overall grade by using a running calculation of each section within the scoring system;

merging the quantified opinion of multiple users;

providing a standard set of criteria on which to form a fundamental basis for agreement;

applying descriptive tags to selected text for the purposes of tracking a reviewer's opinion;

calculating each descriptive tag to quantify the reviewer's overall feedback;

tagging selected text with frequent words/comments;

choosing selected text for comments and feedback;

creating a detailed computerized document, in the form of a report that can be printed, collaborated and distributed electronically;

compiling quantified feedback for tracking trends, searching, archiving and enhancing the system database.

* * * * *

UNITED STATES PATENT AND TRADEMARK OFFICE
CERTIFICATE OF CORRECTION

| | | |
|---|---|---|
| PATENT NO. | : 8,019,755 B2 | Page 1 of 1 |
| APPLICATION NO. | : 12/927758 | |
| DATED | : September 13, 2011 | |
| INVENTOR(S) | : Robin Hillary and Michelle McCarthy | |

It is certified that error appears in the above-identified patent and that said Letters Patent is hereby corrected as shown below:

Col. 1, Line 14, Insert The Following:

--This patent is a Continuation In Part from patent 7,865,510 and should claim the File Date of 7/12/07.--

Signed and Sealed this
Nineteenth Day of June, 2012

David J. Kappos
*Director of the United States Patent and Trademark Office*